United States Patent
Kintz

(10) Patent No.: US 11,402,488 B2
(45) Date of Patent: Aug. 2, 2022

(54) SIDELOBE DETECTOR AND ANGLE/ANGLE-RATE ESTIMATOR FOR A SLEWING MONOPULSE ANTENNA

(71) Applicant: Massachusetts Institute of Technology, Cambridge, MA (US)

(72) Inventor: Andrew L. Kintz, Maynard, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 225 days.

(21) Appl. No.: 16/797,623

(22) Filed: Feb. 21, 2020

(65) Prior Publication Data

US 2020/0292691 A1    Sep. 17, 2020

Related U.S. Application Data

(60) Provisional application No. 62/817,673, filed on Mar. 13, 2019.

(51) Int. Cl.
*G01S 13/68* (2006.01)
*H01Q 3/00* (2006.01)

(52) U.S. Cl.
CPC ............ G01S 13/685 (2013.01); H01Q 3/005 (2013.01)

(58) Field of Classification Search
CPC .. G01S 13/4445; G01S 13/685; G01S 7/2813; H01Q 3/005
See application file for complete search history.

(56) References Cited

U.S. PATENT DOCUMENTS

| | | |
|---|---|---|
| 5,400,035 A * | 3/1995 | Liu ..................... G01S 13/685 342/149 |
| 6,169,518 B1 | 1/2001 | Nelson et al. |
| 6,674,390 B1 | 1/2004 | Murphy |
| 7,479,920 B2 | 1/2009 | Niv |
| 2003/0210170 A1 | 11/2003 | Krikorian et al. |
| 2009/0046901 A1 | 2/2009 | Kittier et al. |
| 2013/0200207 A1 | 8/2013 | Pongratz et al. |
| 2017/0307732 A1 | 10/2017 | Haghighi et al. |

FOREIGN PATENT DOCUMENTS

WO    WO-2019030857 A1 *    2/2019    ............... G01S 3/46

OTHER PUBLICATIONS

International Search Report and Written Opinion dated Oct. 26, 2020 in corresponding PCT application No. PCT/US2020/019250.
Richmond, "Performance of the Adaptive Sidelobe Blanker Detection Algorithm in Homogeneous Environments", IEEE Transactions on Signal Processing, vol. 48, No. 5, pp. 1235-1247, May 2000.

(Continued)

*Primary Examiner* — Timothy A Brainard
(74) *Attorney, Agent, or Firm* — Nields, Lemack & Frame, LLC

(57) ABSTRACT

The present system and method allow for accurate estimation of angle and angle rate for a target using a slewing antenna. These issues are accounted for by using a special form of non-coherent integration. An extension of the non-coherent integration may be used to estimate the target's angle rates. This technique can also be expanded to determine whether a target is in the main lobe or in a side lobe in one or two directions.

19 Claims, 14 Drawing Sheets

(56) References Cited

OTHER PUBLICATIONS

Schmidt, "Multiple Emitter Location and Signal Parameter Estimation", IEEE Transactions on Antennas and Propagation, vol. AP-34, No. 3, Mar. 1986.
Skolnik, Radar Handbook, Third Edition. Chapter 9 Tracking Radar, Chapter (McGraw-Hill Professional, 2008), AccessEngineering.
Wax et al., "Decentralized Processing in Sensor Arrays", IEEE Transactions on Acoustics, Speech, and Signal Processing, vol. ASSP-33, No. 4, Oct. 1985.
Weiss et al., "Direct Position Determination of Multiple Radio Signals", EURASIP Journal on Applied Signal Processing, 2005, vol. 1, pp. 37-49.

* cited by examiner

SIDELOBE DETECTOR AND ANGLE/ANGLE-RATE ESTIMATOR FOR A SLEWING MONOPULSE ANTENNA

This application claims priority of U.S. Provisional Patent Application Ser. No. 62/817,673, filed Mar. 13, 2019, the disclosure of which is incorporated herein by reference in its entirety.

This invention was made with Government support under Grant No. FA8702-15-D-0001 awarded by the U.S. Air Force. The Government has certain rights in the invention.

BACKGROUND

Radars are regularly upgraded to improve sensitivity and detect smaller targets at longer ranges. One approach to improve sensitivity is to coherently integrate echoes received from a target. Coherent integration adds signal energy received from multiple radar pulses, which allows the signal to stand out from the noise. After a radar has detected a target, it will generally estimate various target parameters such as range, range-rate, angles, and angle rates. Parameter estimation yields the target's state and allows the radar to initiate a track on the target if desired.

Coherent integration improves sensitivity even if the radar slews rapidly to scan for unknown targets. In this case, however, coherent integration cannot be used for angle estimation. Since the radar is slewing, each returned pulse will arrive from a different angle off of antenna boresight. Coherent integration of a monopulse difference channel would combine all pulses to yield a single metric for each angle (e.g. azimuth or elevation) to be estimated. That metric would be mapped to a single angle estimate based on the antenna's known monopulse response. Forming a single angle estimate in this way would be incorrect since every pulse arrived from a different angle. In addition, enhanced sensitivity via coherent integration increases the frequency that a target residing in an antenna sidelobe yields a target detection. Sidelobe detections are generally undesirable as known targets may be declared as new targets. Furthermore, tracking targets residing in antenna sidelobes is difficult due to low antenna gain in a sidelobe and poor angle estimation if the target is incorrectly assumed to reside in the antenna mainlobe.

Antenna slew could be accounted for during angle estimation by estimating angles for individual pulses. The estimated angles could then be offset for the known antenna pointing and averaged. However, this would sacrifice the improved signal-to-noise ratio (SNR) from coherent integration and may lead to high-variance angle estimates that are unusable by the radar as it attempts to initiate track on the target.

Therefore, it would be beneficial if there were a system, method and algorithm that estimates target angles for a slewing antenna while addressing the problems of low SNR, different angles-off-boresight for each pulse, and the possibility of target detections from the antenna sidelobes.

SUMMARY

The present system and method allow for accurate estimation of angle for a target using a slewing antenna. These issues are accounted for by using a special form of non-coherent integration. An extension of the non-coherent integration may be used to estimate the target's angle rates. This technique can also be expanded to determine whether a target is in the main lobe or in a side lobe in one or two directions.

According to one embodiment, an antenna system is disclosed. The antenna system comprises a slewing monopulse antenna; a controller in communication with the slewing monopulse antenna, wherein the controller comprises a processing unit and a memory device, and the memory device contains instructions, which when executed by the processing unit, enable the controller to: receive a plurality of sets of observed monopulse signals from the antenna, each set of observed monopulse signals indicative of the difference and sum channels, wherein each set of observed monopulse signals is generated for a respective pulse transmitted by the slewing monopulse antenna; associate each set of observed monopulse signals with a time and a slew angle; generate an observed monopulse vector for each set of observed monopulse signals; compare the observed monopulse vectors with test vectors, wherein the test vectors are generated over a range of angles using a-priori information about the antenna; and determine an angle of a target based on the comparison. In certain embodiments, the controller associates a time and a slew angle of the slewing monopulse antenna with each set of observed monopulse signals. In some embodiments, the test vectors are generated for a range of azimuth and/or elevation angles. In certain embodiments, the controller creates a projection matrix for each test vector, and the projection matrix is multiplied by each of the observed monopulse vectors to create a projection sum for each angle, and the azimuth and/or elevation angle associated with the largest projection sum is determined to be the angle of the target. In certain embodiments, the test vectors are generated for a range of azimuth and/or elevation angles and target angle rates and the controller determines an angle rate of the target based on the comparison. In certain further embodiments, the controller creates a projection matrix for each test vector, and the projection matrix is multiplied by each of the observed monopulse vectors to create a projection sum for each angle and target angle rate, and the azimuth and/or elevation angle and target angle rate associated with the largest projection sum are determined to be the angle of the target and the angle rate of the target. In some embodiments, the angle of the target is compared to a library of objects that are known, and the controller slews the monopulse antenna to the target if the angle of the target does not correspond to any objects that are known.

According to another embodiment, an antenna system is disclosed. The antenna system comprises a slewing monopulse antenna, wherein the monopulse antenna transits pulses having a main lobe and one or more sidelobes; a controller in communication with the slewing monopulse antenna, wherein the controller comprises a processing unit and a memory device, and the memory device contains instructions, which when executed by the processing unit, enable the controller to: receive a plurality of sets of observed monopulse signals from the antenna, each set of observed monopulse signals indicative of the difference and sum channels, wherein each set of observed monopulse signals is generated for a respective pulse transmitted by the slewing monopulse antenna; and determine whether a target is within the main lobe or is in one of the one or more side lobes. In some embodiments, the memory device further comprises instructions, which when executed by the processing unit, enable the controller to: generate an observed monopulse vector for each set of observed monopulse signals; compare the observed monopulse vectors with test vectors, wherein the test vectors are generated over a range of angles using a-priori information about the antenna, wherein the range of angles includes the one or more side lobes; and determine whether the target is within the main lobe based on the comparison. In certain embodiments, the controller creates a projection matrix for each test vector, and the projection matrix is multiplied by each of the observed monopulse vectors to create a projection sum for each angle, and the angle associated with the largest projection sum is used to determine whether the target is in the main lobe or in one of the one or more side lobes. In some embodiments, the memory device further comprises instructions, which when executed by the processing unit, enable the controller to: generate an observed monopulse vector for each set of observed monopulse signals; compare the observed monopulse vectors with test vectors, wherein the test vectors are generated over a range of angles using a piecewise linear approximation of a discriminant, the discriminant defined as the ratio of the difference channel to the sum channel, wherein the range of angles includes the one or more side lobes; and determine whether the target is within the main lobe based on the comparison. In certain embodiments, a slope of the discriminant in the main lobe is less than a slope of the discriminant in the one or more side lobes, and the difference in the slope is used to determine whether the target is within the main lobe. In certain embodiments, the controller slews the monopulse antenna in the azimuth direction and wherein, if the target is determined to be in one of the one or more side lobes, the controller continues the slewing to scan for additional targets.

According to another embodiment, an antenna system is disclosed. The antenna system comprises a slewing monopulse antenna, wherein the monopulse antenna transits pulses having a main lobe and one or more sidelobes; a controller in communication with the slewing monopulse antenna, wherein the controller comprises a processing unit and a memory device, and the memory device contains instructions, which when executed by the processing unit, enable the controller to: slew the antenna to scan for targets; receive a plurality of sets of observed monopulse signals from the antenna, each set of observed monopulse signals indicative of the difference and sum channels, wherein each set of observed monopulse signals is generated for a respective pulse transmitted by the slewing monopulse antenna; determine an angle of the target based on the sets of observed monopulse signals; compare the angle of the target to a library of objects that are known; if the object is known, continue slewing the antenna; if the object is not known, determining if the target is in the main lobe or in one of the one or more sidelobes; if the object is in one of the one or more sidelobes, continue slewing the antenna; and if the object is not known and is in the main lobe, slewing the antenna to the target. In certain embodiments, the instructions to determine the angle of the target comprise instructions, which when executed by the processing unit, enable the controller to: associate each set of observed monopulse signals with a time and a slew angle; generate an observed monopulse vector for each set of observed monopulse signals; compare the observed monopulse vectors with test vectors, wherein the test vectors are generated over a range of angles using a-priori information about the antenna; and determine the angle of the target based on the comparison. In some embodiments, the controller determines an angle rate of the target based on the sets of observed monopulse signals and the controller compares the angle and the angle rate of the target to the library of objects that are known. In certain embodiments, the instructions to determine the angle and angle rate of the target comprise instructions, which when executed by the processing unit, enable the controller to: associate each set of observed monopulse signals with a time and a slew angle; generate an observed monopulse vector for each set of observed monopulse signals; compare the observed monopulse vectors with test vectors, wherein the test vectors are generated over a range of angles and angle rates using a-priori information about the antenna; and determine the angle and angle rate of the target based on the comparison. In some embodiments, wherein the instructions to determine if the target is in the main lobe or in one of the one or more sidelobes comprises instructions, which when executed by the processing unit, enable the controller to: associate each set of observed monopulse signals with a time and a slew angle; generate an observed monopulse vector for each set of observed monopulse signals; compare the observed monopulse vectors with test vectors, wherein the test vectors are generated over a range of angles using a-priori information about the antenna, wherein the range of angles includes the one or more side lobes; and determine whether the target is within the main lobe based on the comparison. In some embodiments, the controller creates a projection matrix for each test vector, and the projection matrix is multiplied by each of the observed monopulse vectors to create a projection sum for each angle, and the angle associated with the largest projection sum is used to determine whether the target is in the main lobe or in one of the one or more side lobes. In certain embodiments, the instructions to determine if the target is in the main lobe or in one of the one or more sidelobes comprises instructions, which when executed by the processing unit, enable the controller to: generate an observed monopulse vector for each set of observed monopulse signals; compare the observed monopulse vectors with test vectors, wherein the test vectors are generated over a range of angles using a piecewise linear approximation of a discriminant, the discriminant defined as the ratio of the difference channel to the sum channel, wherein the range of angles includes the one or more side lobes; and determine whether the target is within the main lobe based on the comparison.

BRIEF DESCRIPTION OF THE FIGURES

For a better understanding of the present disclosure, reference is made to the accompanying drawings, which are incorporated herein by reference and in which.

DETAILED DESCRIPTION OF INVENTION

Before describing the new system, method and algorithm, an overview of monopulse operation is presented.

Monopulse Overview

Figure 1A:
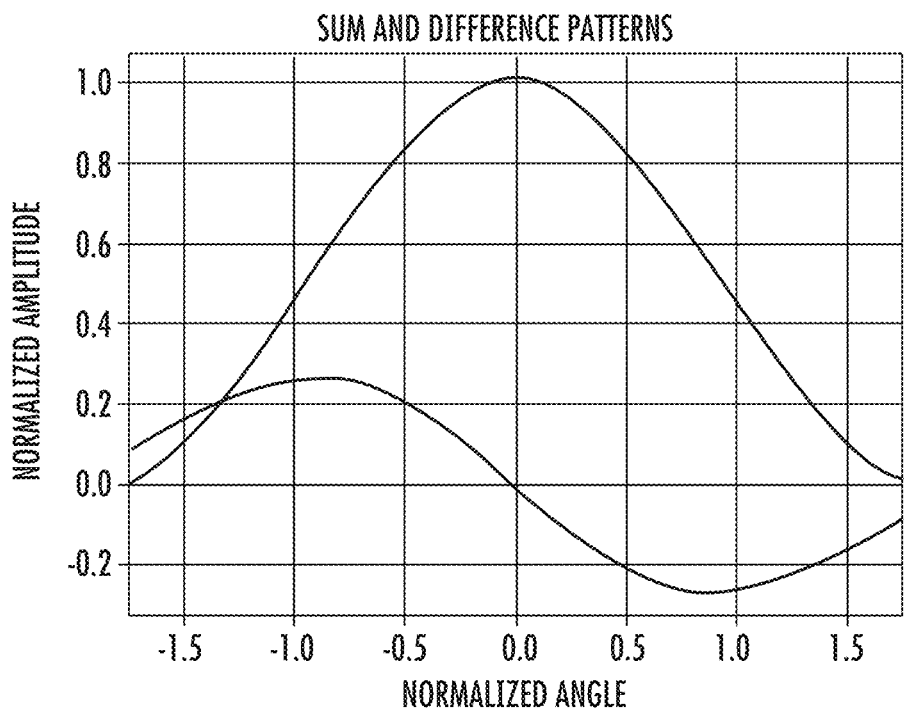
FIG. 1A shows sum and difference channels for a monopulse antenna as a function of normalized angle.
Figure 1B:
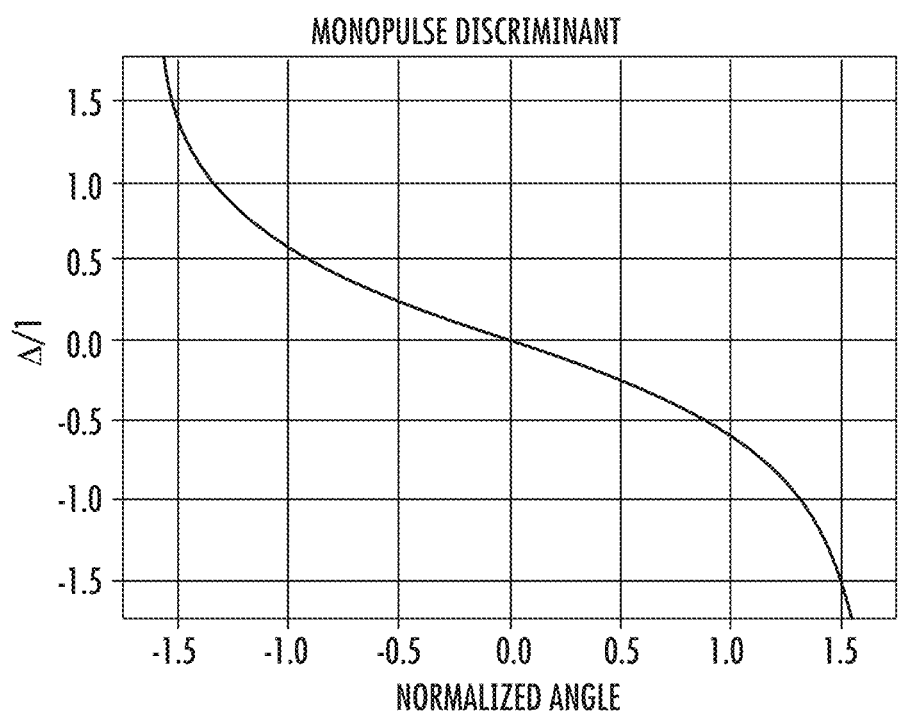
FIG. 1B shows the monopulse discriminator function as a function of normalized angle.

A monopulse antenna estimates target angles indirectly by first estimating a monopulse metric and mapping from the metric to angle using a discriminator function. A basic monopulse discriminator function (e) is given by:

$$e = Re\{\Delta/\Sigma\} \quad (1)$$

where $\Delta$ is the magnitude of the difference of two or more squinted beams; $\Sigma$ is the magnitude of the sum of the squinted beams; and Re takes the real part of a complex quantity. The sum and difference channels and the discriminator function may be visualized as shown in FIGS. 1A and 1B, respectively. In these figures, the horizontal axis is normalized angle, which is defined as the distance from boresight divided by the 3 dB beamwidth. Thus, a value of 1.0 indicates that the azimuth is exactly one 3 dB beamwidth from boresight.

Figure 2A:
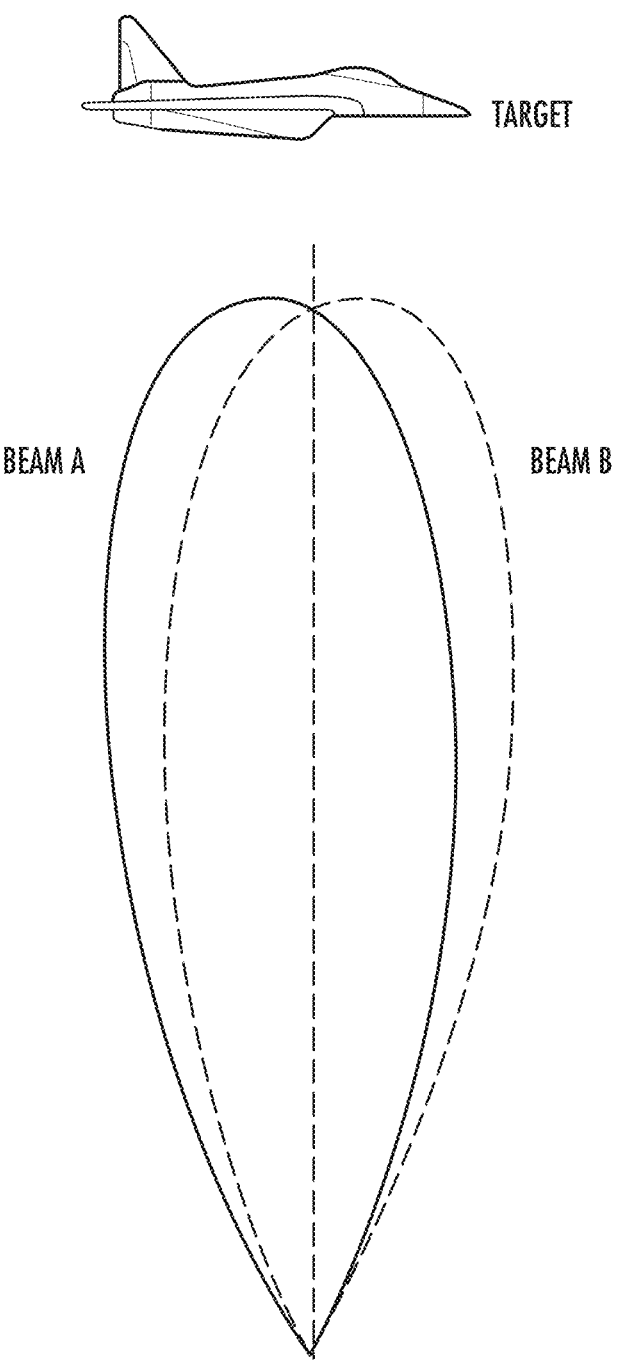
FIG. 2A shows two squinted beams directed toward a target.

One illustration of the squinted beams is shown in FIG. 2A. Beams A and B are used to form the sum and difference channels according to $\Delta = A - B$ and $\Sigma = A + B$. Note that A and B ideally have the same phase, $\exp(j2\pi Rrt/\lambda)$, where $R_{rt}$ is the round-trip range to the target, and $\lambda$ is the wavelength of the radar's carrier frequency. Consequently, the monopulse discriminator of FIG. 1B is real; however, its sign depends on whether the target is closer to beam A than beam B or vice-versa.

Figure 2B:
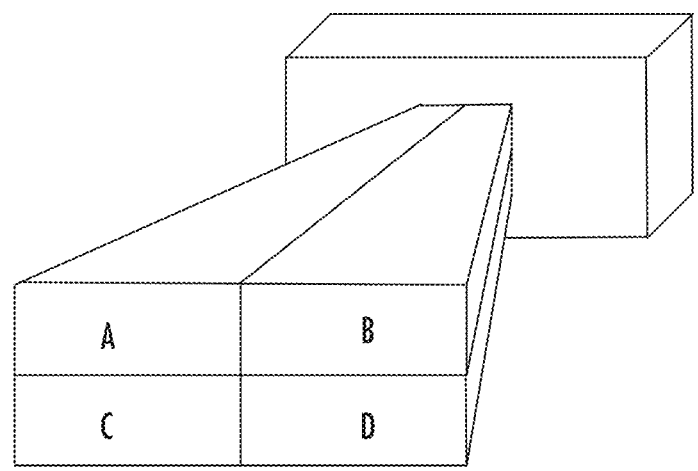
FIG. 2B shows a four horn monopulse antenna.
Figure 2C:
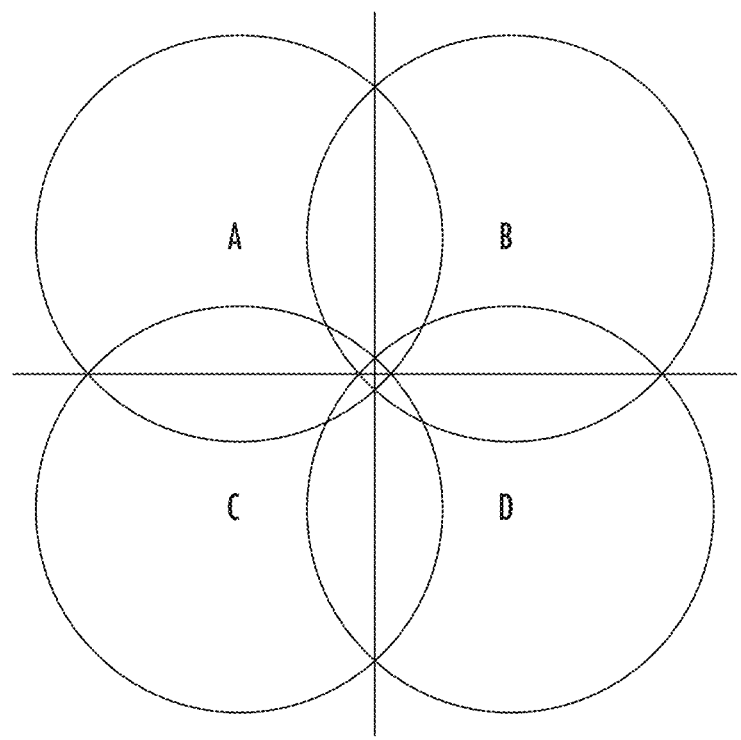
FIG. 2C shows a plot that represents the four squinted beams from the antenna of FIG. 2A.

FIG. 2B shows a four horn monopulse antenna. In this embodiment, there are four squinted beams, A, B, C and D. The sum channel is defined as the sum of these four squinted beams. Additionally, there are two difference channels. The first is the azimuth difference channel, which can be found by subtracting the sum of the beams on the right side from the sum of the beams on the left side. Stated differently, the azimuth difference ($\Delta_{AZ}$) can be expressed as (A+C)-(B+D). The second is the elevation difference channel, which can be found by subtracting the sum of the beams on the bottom from the sum of the beams on the top. Stated differently, the elevation difference ($\Delta_{EL}$) can be expressed as (A+B)-(C+D). FIG. 2C shows a plot that represents the four squinted beams. The vertical axis represents azimuth boresight while the horizontal axis represents elevation boresight. Note that are azimuth boresight, (A+C)-(B+D) is zero. Similarly, at elevation boresight, (A+B)-(C+D) is zero. Thus, the greater the distance the target is from boresight, the larger the magnitude of the respective difference channel becomes.

Non-Coherent Monopulse for Stationary Antenna/Stationary Target

Non-coherent integration is often synonymous with taking an absolute value. However, FIG. 1B shows that the monopulse discriminant is a signed value. Therefore, using absolute values to non-coherently integrate the monopulse channel would destroy the information regarding the direction to the target.

A novel approach for monopulse estimation is to form a set of hypothesized target angles and project estimates of an observed-monopulse vector $$\vec{v}_n = [\Delta_n \Sigma_n]^T \quad (2)$$

from N received pulses onto the various hypotheses. Here, $\Sigma_n$ is the complex-valued sum channel at the range gate that yielded a detection, and $\Delta_n$ is the complex-valued difference channel at the same range gate.

Since this algorithm is only calculating the angle in one direction, the difference channel ($\Delta_n$) may be either the azimuth difference or the elevation difference. The methodology described is the same for either difference channel. However, the following equations assume that the difference channel is the azimuth difference.

For each hypothesis, we can use the squinted-beam patterns to form the test vectors $$\vec{u}(\varphi) = [\Delta(\varphi) \Sigma(\varphi)]^T \quad (3)$$

where $\varphi$ is an azimuth angle within the range of possible target angles. Note, however, that this technique is equally applicable to elevation angles.

The test vectors can be normalized according to:

$$\hat{u}(\varphi) = \frac{\vec{u}(\varphi)}{\|\vec{u}(\varphi)\|} \quad (4)$$

The difference between observed monopulse vector shown in equation (2) and the test vector shown in equation (3) is that the observed monopulse vector in equation (2) comes from the nth pulse. N total observed monopulse vectors will be formed, one for each pulse. On the other hand, the test vectors shown in equation (3) are generated using a-priori information about the antenna pattern, and these test vectors span the range and resolution of angles-off-boresight that are to be tested as possible target angles. The $\Delta(\varphi)$ and $\Sigma(\varphi)$ values correspond to an expected value for a given angle, and these values may be based on electromagnetic simulations or a field calibration of the radar antenna. The observed monopulse vectors shown in equation (2) are to be compared to the test vectors shown in equation (3) to identify which test vector best matches the observations.

In order to compare test vectors with observations, a projection matrix is formed for each test vector. The projection matrix for a given angle is simply:

$$P(\varphi) = \hat{u}(\varphi) \hat{u}^T(\varphi) \quad (5)$$

where $\hat{u}^T(\varphi)$ is the transpose of normalized test vector $\hat{u}(\varphi)$. Note that if the test vectors are complex instead of real, then the transpose is replaced with a Hermitian operator.

For each hypothesized $\varphi$, N observations are used to form the real sum:

$$E(\varphi) = \Sigma_{n=1}^{N} \|P(\varphi) \vec{v}_n\|^2 \quad (6)$$

Where $E(\varphi)$ represents the projection sum for angle ($\varphi$).

The estimated angle of the target is simply the angle that maximizes $E(\varphi)$. This is the angle for which the observed sum and difference channel values best agree with the sum and difference channel values for the hypothesized angle. For a stationary target and a stationary antenna, this technique is similar to the MUSIC algorithm for direction of arrival estimation.

Non-Coherent Monopulse for Slewing Antenna/Stationary Target

Modifications allow the above approach to be applied for a slewing antenna. In this case, assume that the antenna slew-angle is known for each pulse. Let the offset for pulse n from the center pulse be $\varphi'_n$. Then, $$\vec{u}_n(\varphi)=[\Delta(\varphi-\varphi'_n)\Sigma(\varphi-\varphi'_n)]^T \quad (7)$$

In this case, since the antenna typically slews in the azimuth direction, it may be assumed that the quantity ($\Delta(\varphi-\varphi'_n)$) in this algorithm refers to the azimuth difference channel (i.e. $\Delta=\Delta_{AZ}=(A+C)-(B+D)$.

Now, equations (4)-(6) above can be adapted from the stationary case by adding a subscript for pulse n:

$$\hat{u}_n(\varphi) = \frac{\vec{u}_n(\varphi)}{\|\vec{u}_n(\varphi)\|} \quad (8)$$

$$P_n(\varphi) = \hat{u}_n(\varphi)\hat{u}_n^T(\varphi) \quad (9)$$

$$E(\varphi) = \Sigma_{n=1}^N \|P_n(\varphi)\vec{v}_n\|^2 \quad (10)$$

Figure 3:
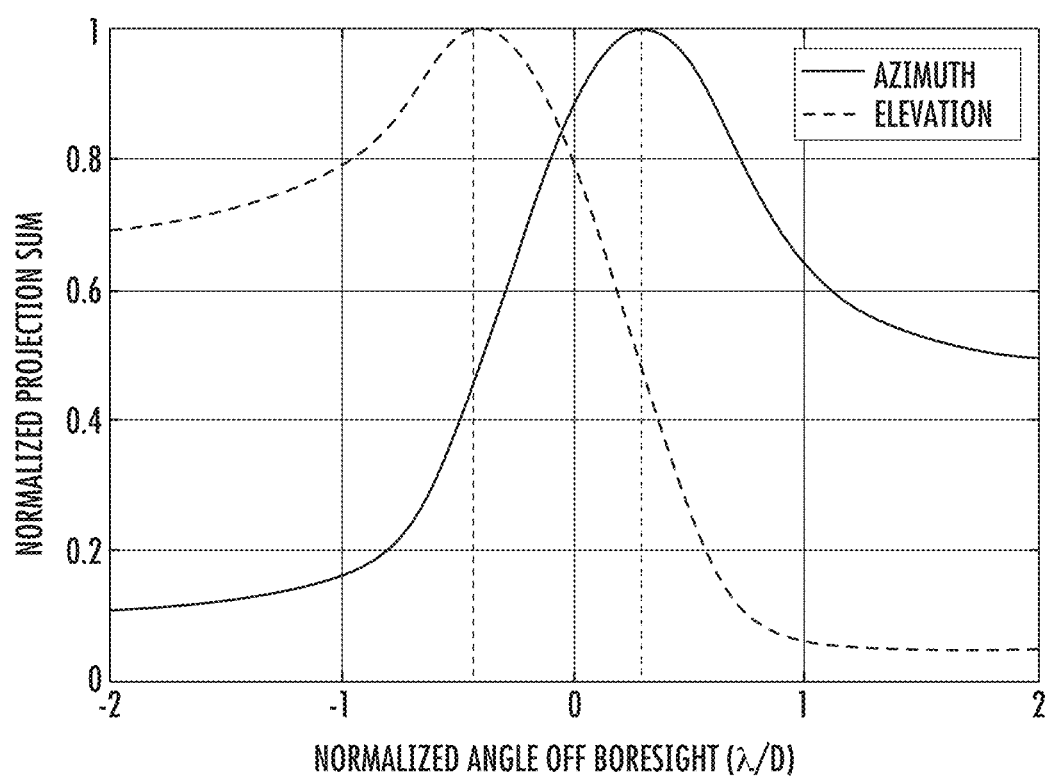
FIG. 3 shows simulated example using the algorithm described herein.

A simulated example of the elevation and azimuth spectra generated by this function is shown in FIG. 3. The example simulates a ground based radar scanning in azimuth and attempting to detect a resident space object. The radar collects the sum, the azimuth difference and the elevation difference channels. The simulation assumes 32 pulses from a processing interval that yielded a coherent detection in the sum channel. The pulses are received during a time-interval in which the antenna slews a half beamwidth in azimuth. After coherent detection, the non-coherent azimuth estimation function ($E(\varphi)$) and the elevation estimation function ($E(\theta)$), collectively known as spectra, were calculated according to equation (10) and equation (6), respectively.

FIG. 3 shows that the spectra correctly estimate the target angles, which are off-boresight in both azimuth and elevation. The functions are also smooth and unambiguous, while having significant contrast between the angle estimates and the other hypothesized angles.

This technique for mapping several observations of a target to various hypothesized angles shares features with existing techniques in the field of target geolocation. Several geolocation algorithms have been built on top of MUSIC to combine multiple, diverse observations of a single radio source from various locations and produce a single spectrum from which the target location can be estimated. These techniques apply to passive receivers that are geolocating targets on the ground, and they are applied to non-directional antenna arrays.

Here, in contrast, the approach has been applied to an individual and highly-directional radar antenna that observed a target from multiple angles-off-boresight as it slewed past the target. The observations of the target are mapped to a fixed angle domain instead of being mapped to the ground.

Non-Coherent Monopulse for Slewing Antenna/Moving Target

The above approach can be extended to be a novel estimator of angles and angle-rates. To estimate angle rates, a 2D spectrum is formed where one axis is the angle off boresight (e.g. the same x-axis as in FIG. 3), and the second axis is the target angle-rate.

Various target angle rates ($\dot\varphi$) are hypothesized by forming appropriate projection matrices starting from a modified version of the test vector shown in equation (7) that accounts for a hypothesized angle rate:

$$\vec{u}_n(\varphi,\dot\varphi)=[\Delta(\varphi-\varphi'_n-\dot\varphi t_n)\Sigma(\varphi-\varphi'_n\dot\varphi t_n)]^T \quad (11)$$

where $t_n$ is the time of the nth pulse relative to the center pulse. The new dependence on $\dot\varphi$ is carried from equation (10), yielding $$E(\varphi,\dot\varphi)=\Sigma_{n=1}^N \|P_n(\varphi,\dot\varphi)\vec{v}_n\|^2 \quad (12)$$

The target angle and angle rate are jointly estimated as the angle/angle-rate that maximizes the 2D spectrum formed by equation (12).

Figure 4:
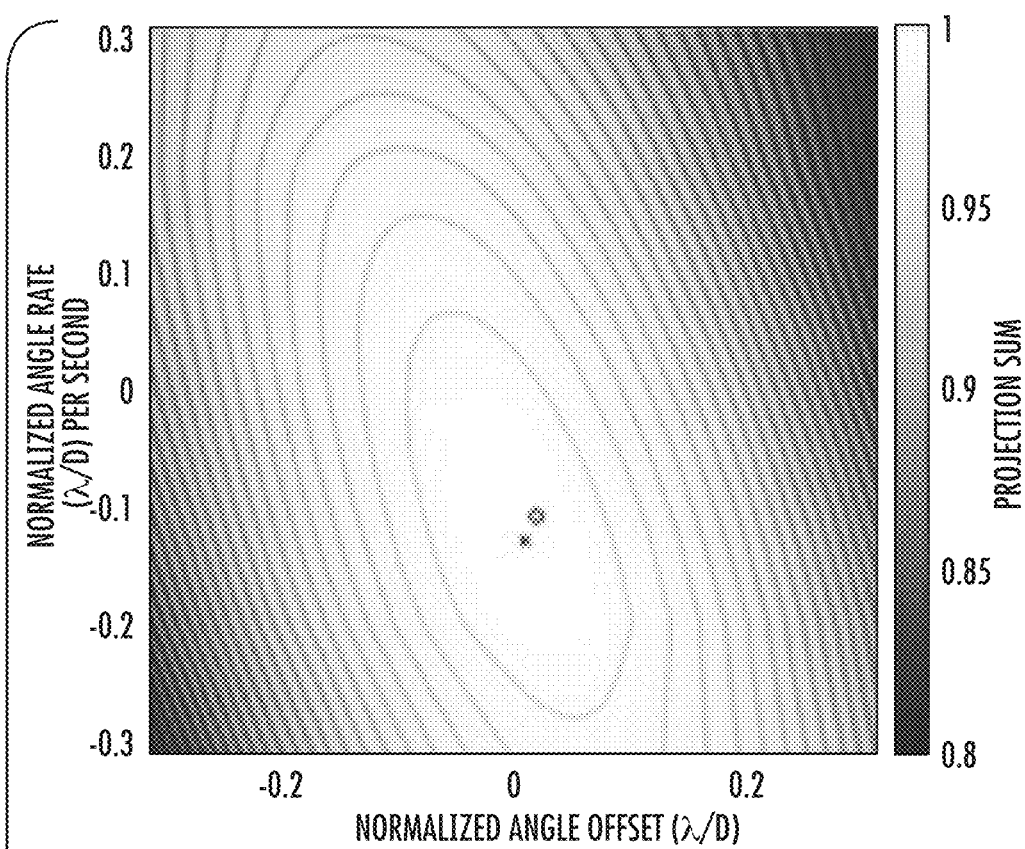
FIG. 4 shows an example 2D spectra for azimuth and azimuth-rate using simulated data.
Figure 4:
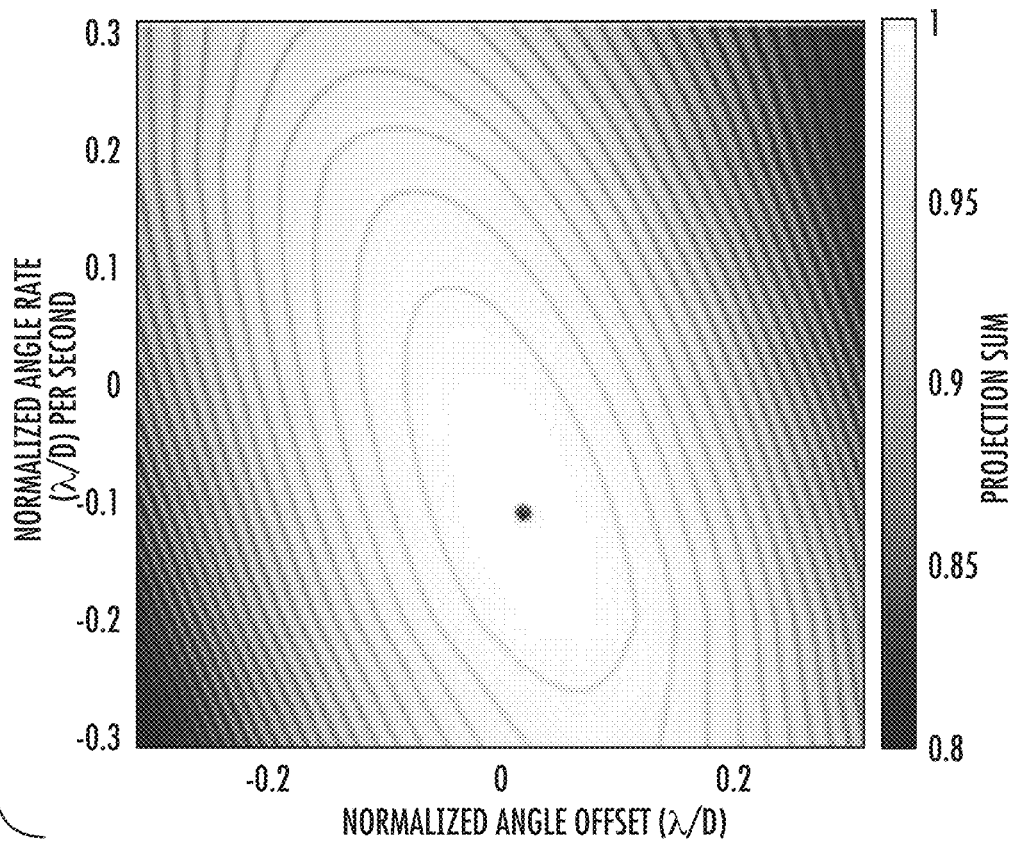

FIG. 4 shows an example 2D spectra for azimuth and azimuth-rate using two seconds of simulated data. The antenna slews along azimuth non-uniformly at an average rate of 1.0 beamwidths per second, and the target azimuth rate is −0.10 beamwidths per second. With a median simulated SNR of about 25 dB, the error in the estimated azimuth-rate is about 0.01 beamwidths and 0.02 beamwidths per second. The corresponding spectrum is shown in the top plot. Removing noise from the simulation yields leaves only discretization error in the angle and angle-rate estimates, as expected. The corresponding spectrum is shown in the bottom plot. Note in both cases that the peak azimuth for an assumed azimuth rate of zero beamwidths per second is biased by about 0.03 beamwidths relative to the true azimuth. Thus, joint angle and angle-rate estimation is a requirement for achieving an unbiased angle estimate of a moving target via non-coherent integration.

The algorithm described herein non-coherently integrates the signed monopulse difference channel by hypothesizing various target angles and projecting observations onto test vectors corresponding to the hypotheses. This approach benefits angle estimation with non-coherent gain without losing the sign of the direction to the target. The approach incorporates arbitrary motion by an antenna that is slewing as it seeks a target. It also can incorporate joint estimation of a target's angle rate. Joint angle and angle rate estimation is required for achieving an unbiased angle estimate of a moving target. Obtaining non-coherent gain for angle estimates and the novel ability to estimate angle rates directly from the monopulse data may greatly aid the radar in initiating a track on a detected target. The same algorithm may be applied to any scanning receiver, such as a beacon tracker, that uses a monopulse feed or a direction finding array to estimate the angle to a target.

System and Method

Figure 5:
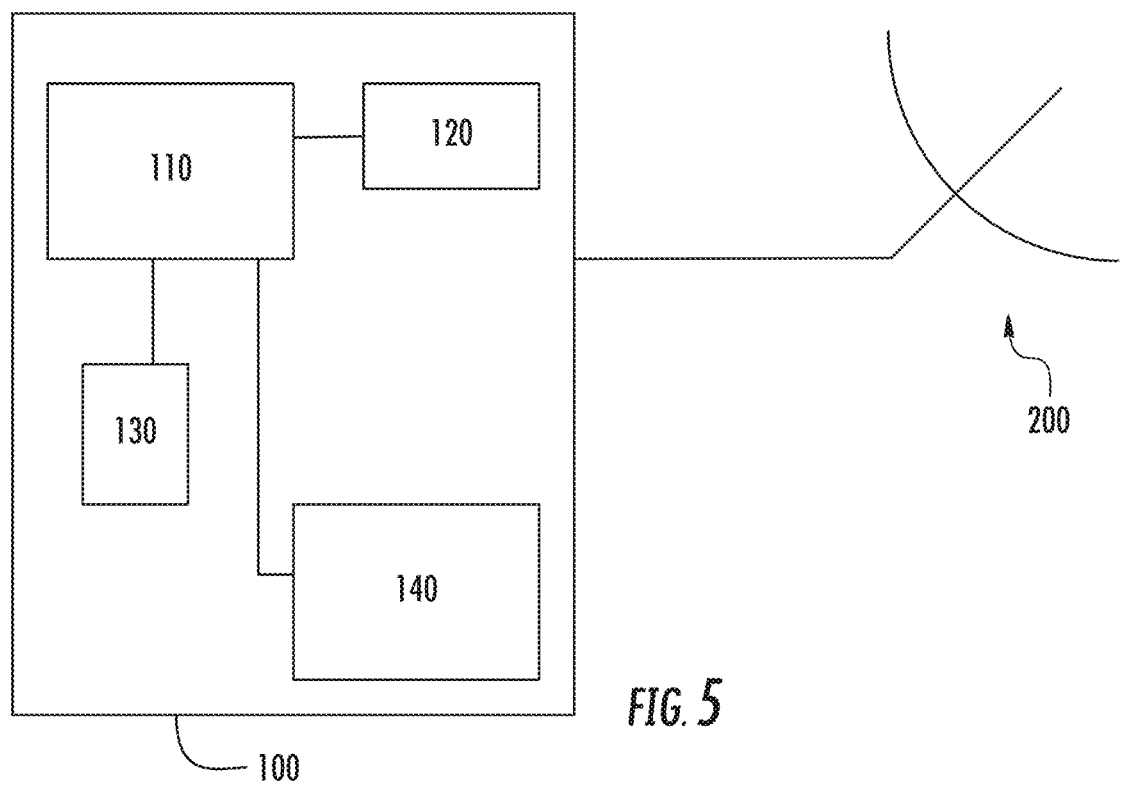
FIG. 5 shows a system having a controller and a slewing antenna that may be used to implement the algorithms described herein.

Having described an algorithm to determine an angle and angle rate for a moving target and a slewing antenna, a system to perform this algorithm is now disclosed. FIG. 5 shows a system having a controller 100 and a slewing antenna 200. The controller 100 can be implemented in numerous ways, such as with dedicated hardware, or with general purpose hardware, such as a computer system, that is programmed using microcode or software to perform the functions recited herein. Further, the controller 100 may be a mainframe computer, a personal computer, a server or another suitable device. The controller 100 may comprise a processing unit 110 and a local memory device 120. The local memory device 120 may contain instructions, which, when executed by the processing unit 110, enable the system to perform the functions described herein. This local memory device 120 may be a non-volatile memory, such as a FLASH ROM, an electrically erasable ROM or other suitable devices. In other embodiments, the local memory device 120 may be a volatile memory, such as a RAM or DRAM. Additionally, the controller 100 may include a user input device 130, such as a keyboard, mouse, touch screen or another suitable device. The controller 100 may also include a display device 140, such as a computer screen, LED display, touch screen or the like. The user input device 130 and the display device 140 are both in communication with the processing unit 110.

The antenna 200 comprises a slewing monopulse antenna. The monopulse antenna may comprise four horns, such as the one shown in FIG. 2B. The controller 100 is in communication with the antenna 200 so as to receive the observed monopulse vectors. In certain embodiments, the controller 100 also controls the rate at which the antenna 200 slews. The controller 100 is aware of the antenna slew angle for each received observed monopulse vector. The controller 100 is also aware of the antenna pattern via prior antenna calibration so as to be able to create the test vectors.

Figure 6A:
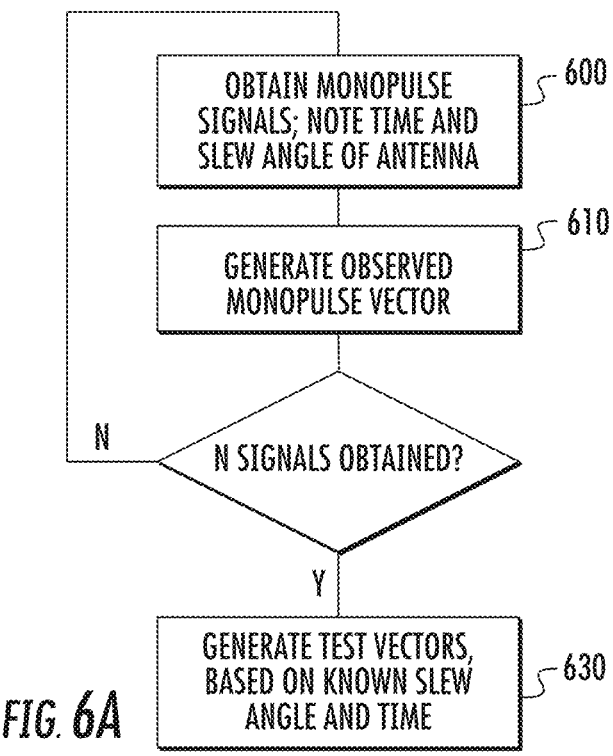
FIG. 6A shows a flowchart that demonstrates how observed monopulse vectors and test vectors are generated.

The controller 100 is then able to calculate target angle and angle rate using a priori information about the antenna pattern and the observed monopulse patterns. FIG. 6A shows a flowchart that demonstrates how the observed monopulse vectors and test vectors are generated.

First, as shown in Process 600, the controller 100 receives observed monopulse signals from the antenna 200. The controller 100 may receive two or more signals; either the magnitude of each of the squinted beams, or the sum ($\Sigma$) and difference ($\Delta$) signals for these beams. In some embodiments, the controller 100 receives three signals; the sum, the azimuth difference and the elevation difference. In other embodiments, the controller 100 may only receive one difference signal. The controller 100 may process the sum channel from the antenna to detect the presence of target(s). Additionally, the controller 100 takes note of the slew angle at the time that the monopulse signal was received. The controller 100 also notes the time at which the pulse was received. After detection of targets using the sum channel, the controller 100 applies the angle estimation algorithms(s) described herein using the signals, slew angles, and pulse times.

Next, as shown in Process 610, the controller 100 generates an observed monopulse vector, $\vec{v}_n$, from the received signals. The controller 100 repeats this sequence for N samples, as shown in Process 620.

Next, as shown in Process 630, since the controller 100 knows the antenna slew angle at each received monopulse signal and the time that the pulse was received, the controller 100 is able to generate an appropriate set of test vectors that include the slew angle ($\varphi'_n$) and the time ($t_n$). Using this information, the controller 100 is able to generate multiple sets of test vectors that are functions of angle ($\varphi$) and angle rate ($\dot\varphi$), such as those shown in equation 11. Each set of N test vectors is specific to a combination of angle ($\varphi$) and angle rate ($\dot\varphi$), at different slew angles and times, as shown in equation (11).

Figure 6B:
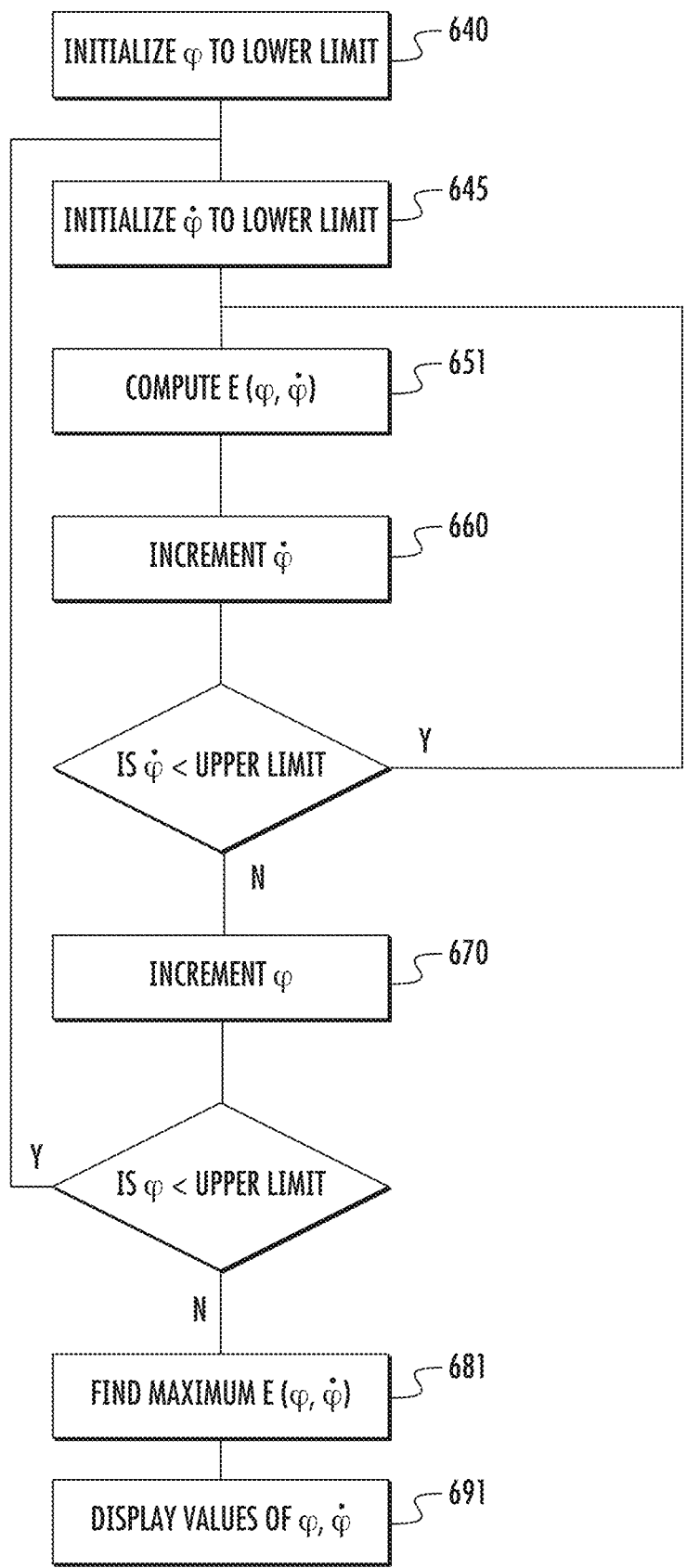
FIG. 6B shows a flowchart that can be used to determine the azimuth position and azimuth angle rate of a target.

FIG. 6B is a flowchart showing how the controller can determine the azimuth position and azimuth angle rate of a target.

First, the controller initializes $\varphi$ and $\dot\varphi$ at a lower limit, as shown in Processes 640, 645. The controller 100 then calculates $E(\varphi, \dot\varphi)$ using the test vectors that were created for this combination of ($\varphi, \dot\varphi$), as shown in Process 650. The controller 100 then increments $\dot\varphi$, as shown in Process 660. If $\dot\varphi$ is less than the upper limit, the controller 100 repeats Process 650 using the test vectors generates for this combination of ($\varphi, \dot\varphi$). When $\dot\varphi$ reaches the upper limit, the controller 100 increments $\varphi$, as shown in Process 670. The controller 100 then resets $\dot\varphi$ to the lower limit, as shown in Process 645. The controller 100 then repeat Processes 650, 660 until $\dot\varphi$ reaches the upper limit. The controller 100 then increments $\varphi$, as shown in Process 670. This repeats until a value of $E(\varphi, \dot\varphi)$ is created using every combination of $\varphi$ and $\dot\varphi$.

The controller 100 then determines the maximum value of $E(\varphi, \dot\varphi)$, as shown in Process 680. The $\varphi$ and $\dot\varphi$ associated with this maximum value are the probable azimuth angle and azimuth angle rate of the target.

The controller 100 may use this information in a number of ways. For example, as shown in Process 690, the controller 100 may display these values on the display device 140. In other embodiments, this information may be forwarded to another system, which compares this information to the catalog of known space objects. This information may help to determine whether the target that was identified by the system is a previously known satellite, or is a new unidentified object.

The above technique describes a system, method and algorithm for determining the angle and angle rate of a target that is in the main lobe of the monopulse antenna. However, there are times where the monopulse antenna will receive a signal when the target is within a side lobe. The ability to distinguish between targets that are in the main lobe and the side lobe may be very beneficial.

Test Vector Generation

Equation (3) above discloses the creation of test vectors that may be used to determine the angle and angle rate of a target. These test vectors may be generated in a plurality of ways.

According to one embodiment, the antenna that is being used is calibrated. For example, the antenna may calibrate its monopulse slopes weekly or monthly by taking measurements on a known calibration target along an azimuth and elevation cut through boresight. These actual measurements may be saved as the test vectors. Thus, each test vector, $\vec{u}(\varphi)$, may be represented as $[\Delta(\varphi) \Sigma(\varphi)]^T$, where $\Delta(\varphi)$ and $\Sigma(\varphi)$ are actual measured values. Of course, if desired, $\Delta(\theta)$, the elevation difference channel, may also be saved.

According to a second embodiment, the calibration data may not be stored as $[\Delta(\varphi) \Sigma(\varphi)]$ pairs. Rather, the data may be fitted in an N-order polynomial equation. In certain embodiments, N may be 5 or greater. In this embodiment, test vectors are generated by plugging various values of $\varphi$ into this N-order polynomial equation.

According to a third embodiment, the test vectors may be modeled using a linear approximation of the discriminant. For example, as shown in FIG. 1B, the discriminant has a slope of about −0.6 between normalized angles from −1.0 to 1.0. The discriminant is also 0.0 at a normalized angle of 0.0. Thus, the discriminant (d) may be modeled as: $d=-0.6*\varphi$. Thus, for normalized angles between −1.0 and 1.0, the test vector may be created as follows.

For a normalized azimuth angle, $\varphi$, the discriminant $d(\varphi)=-0.6*\varphi$. Thus, the test vector may be written as $$= \Sigma(\varphi) * \left[ \frac{\Delta(\varphi)}{\Sigma(\varphi)} \frac{\Sigma(\varphi)}{\Sigma(\varphi)} \right]^T = \Sigma(\varphi) * [d(\varphi)\ 1]^T = \Sigma(\varphi) * [-0.6*\varphi\ 1]^T.$$

This test vector is then normalized to form û(φ). Note that the test vectors are only valid within the range of normalized azimuth angles from −1.0 to 1.0.

Sidelobe Detection

Figure 7:
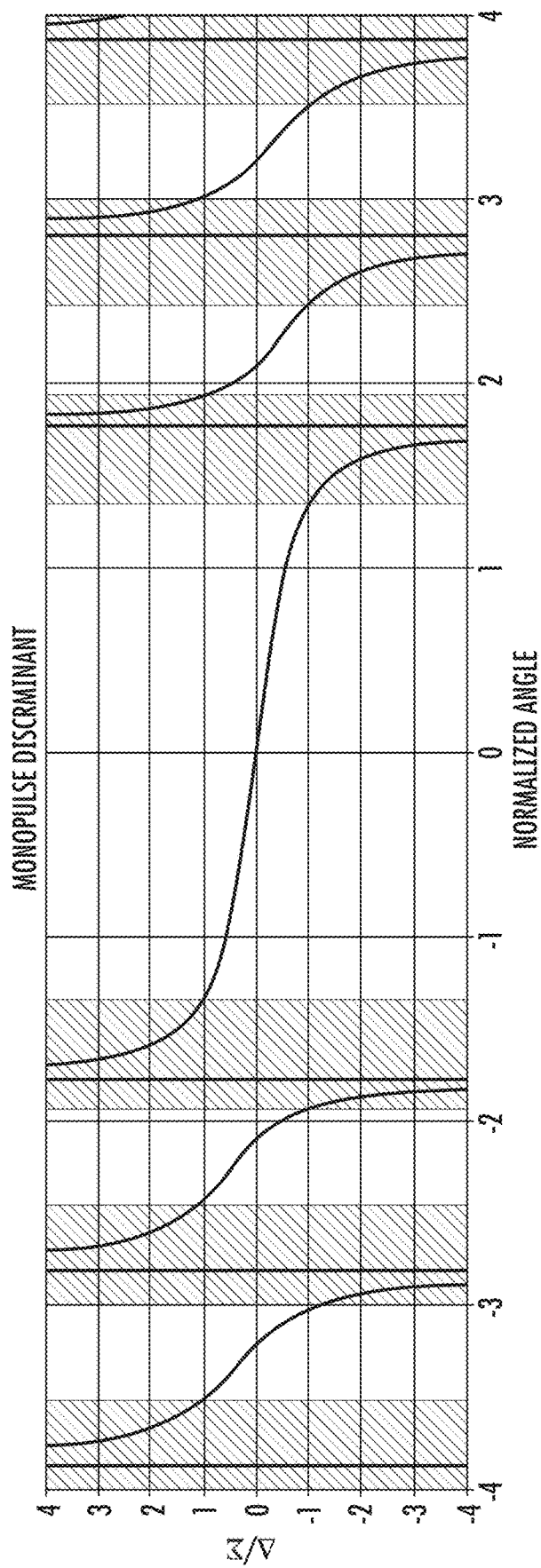
FIG. 7 shows the discriminant as a function of normalized angle over a wide range of angles.

FIG. 7 shows the discriminant as a function of the normalized angle over a wide range of normalized angles that include the main lobe and several side lobes. The region from approximately −1.4 to 1.4 represents the main lobe. The areas outside this region are side lobes. Note that, as described above, the discriminant has a negative slope of approximately −0.6 throughout most of the main lobe, from −1.0 to 1.0. At the ends, the sum (Σ) approaches 0, so the discriminant becomes undefined. In this example, the slope of the discriminant in the side lobes is much steeper, by approximately a factor of 6. This information can be used by a slewing antenna to determine whether a target is in the main lobe or a side lobe. Intuitively, a side lobe detection system may estimate the monopulse ratio at several points in time. Comparing the change in the monopulse ratio to the change in pointing angle over the time span yields an observed monopulse slope. If the observed monopulse slope matches better with the main lobe than with the sidelobes, then the target may be assumed to reside in the main lobe, and vice-versa.

A common approach may be used for angle, angle-rate, and sidelobe estimation for a slewing monopulse antenna. Since this mode calculates a cost function or spectrum over the sidelobes as well as the mainlobe, it will be referred to as the 'Extended Spectra' mode.

There are two approaches that may be used. The first is referred to as extended spectra mode, while the second is referred to as piecewise linear discriminant (PLD) mode. Both approaches utilize the algorithms described above.

Extended Spectra Mode

In this approach, the test vectors are generated based on the actual measurements taken while calibrating the antenna. In other words, the calibration is conducted from normalized angles from roughly −2.5 to 2.5. This range of angles is selected so as to include at least the first sidelobe on each side of the main lobe. These measurements are used to create test vectors that span at least the main lobe and one sidelobe on each side of that main lobe.

Piecewise Linear Discriminant Mode

In this approach, the test vectors are generated based on the linear approximation described above. For example, the test vectors for the main lobe may extend from about −1.2 to 1.2. The test vectors for the side lobes were also generated based on a linear approximation. In this case, the slope of the discriminant is roughly −3.6. For example, as shown in FIG. 7, the discriminant at a normalized angle of −2.1 is equal to 0. If the slope of the discriminant is assumed to be −3.6, the equation for the discriminant in the left side lobe may be expressed as d(φ)=−3.6*(φ+2.1). The test vectors can then be created by normalizing the vector Σ(φ) *[−3.6*(φ)+2.1) 1]$^T$ as described above. The test vectors for the right side lobe may be generated in a similar fashion. To ensure that the entire angular range is covered, the test vectors for the side lobe may extend into the adjacent sidelobe and into the main lobe, although the accuracy of such a wide range is compromised. Of course, the values used above are simply illustrative. The actual values depend on the antenna configuration.

Test Results

The accuracy of these two approaches was determined through simulation and is shown in FIGS. 8A-8B, 9A-9B, and 10A-10B. In each of these graphs, the horizontal axis represents normalized angle and the vertical axis is E(φ), as defined in equation (10). In each case, the target was assumed to not be moving (i.e. φ̇=0). However, the algorithm is equally applicable when the target is moving.

Figure 8A:
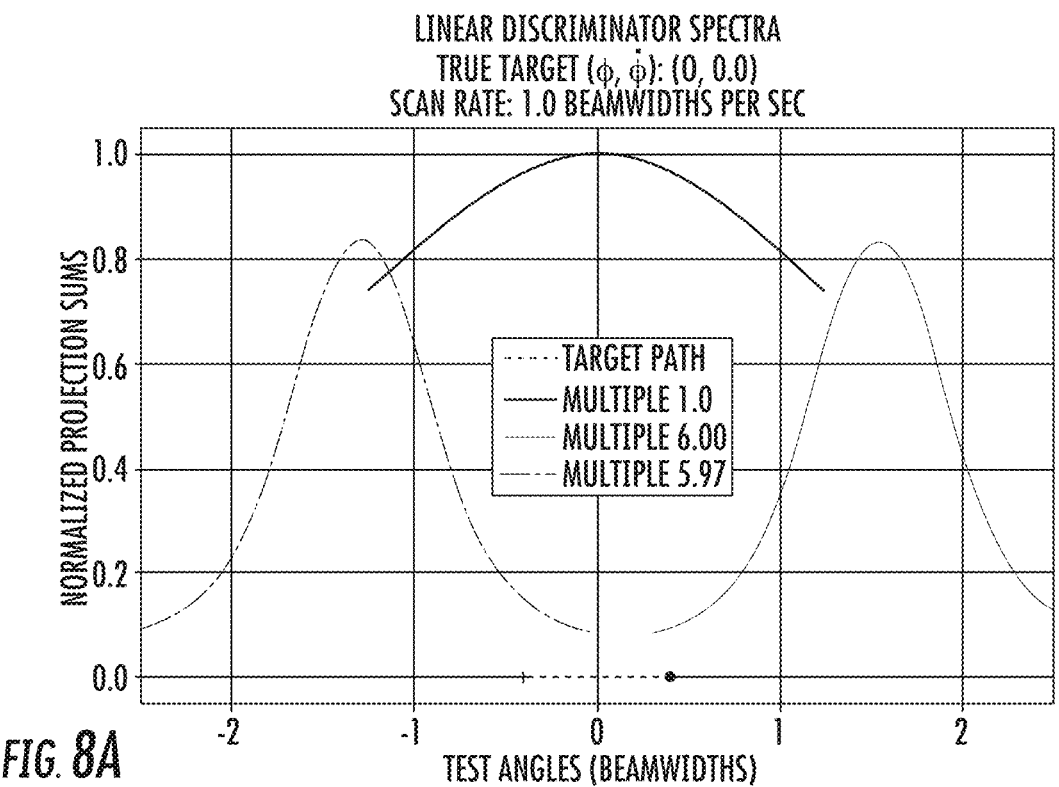
FIGS. 8A-8B show simulated results where a target moving is in the main lobe.
Figure 8B:
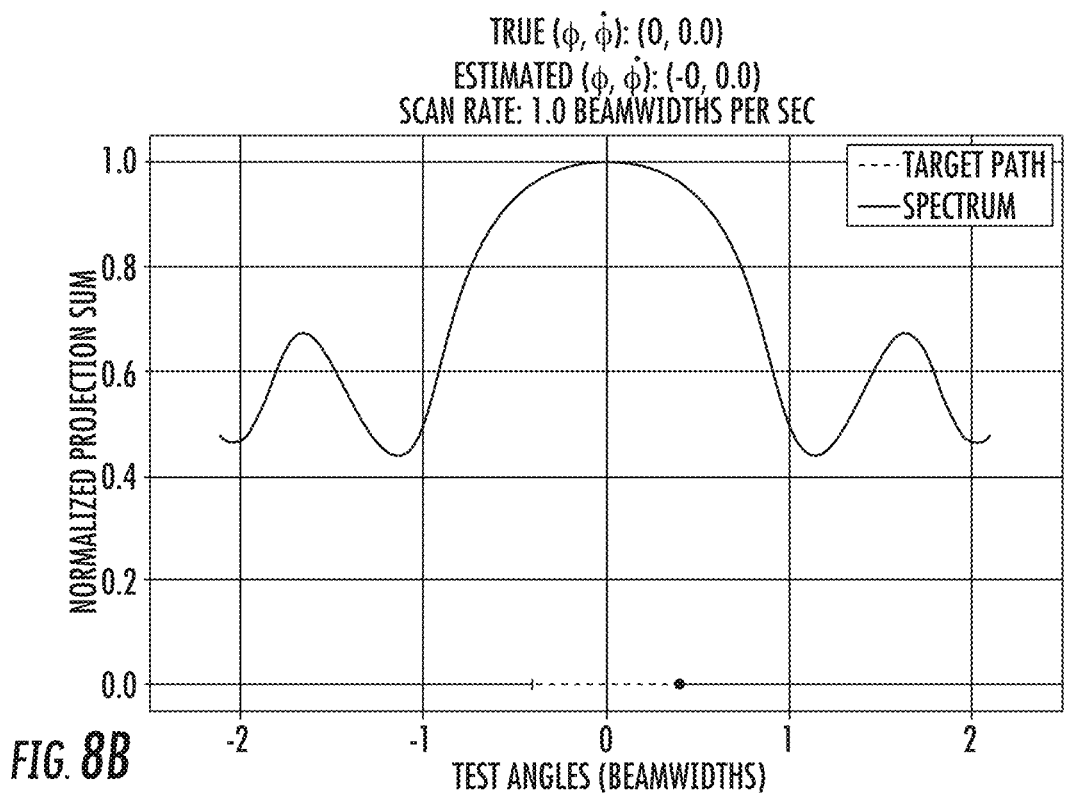

In FIGS. 8A-8B, the slew of the antenna causes the target to move through the main lobe as shown in the dotted line. In FIG. 8A, a piecewise linear discriminant (PLD) approach is used to create the test vectors, while FIG. 8B shows the extended spectra approach. Because the target is moving through an angular range that corresponds to a linear region of the discriminant, the PLD approach is able to correctly identify that the target is in the main lobe. The extended spectra approach also identifies the correct result. Note that the extended spectra approach also correctly determined the azimuth angle rate.

Figure 9A:
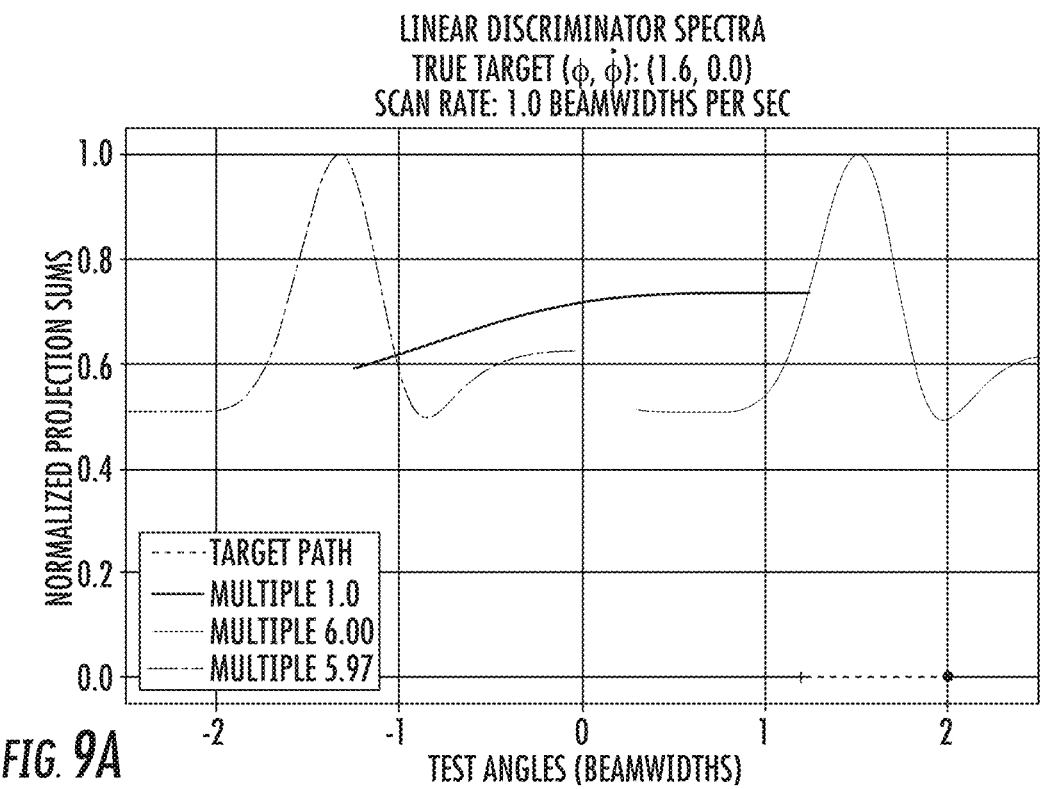
FIGS. 9A-9B show simulated results where a target moving is in a side lobe.
Figure 9B:
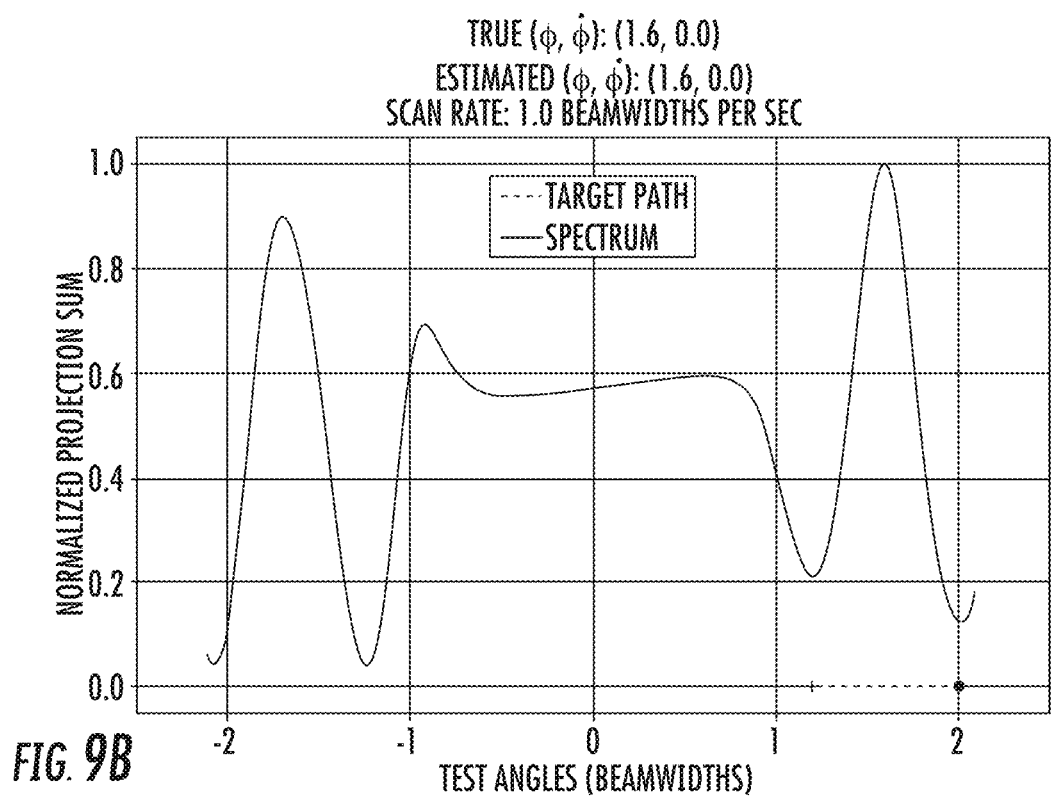

In FIGS. 9A-9B, the slew of the antenna causes the target to move through the side lobe as shown in the dotted line. In FIG. 9A, a piecewise linear discriminant (PLD) approach is used to create the test vectors, while FIG. 9B shows the extended spectra approach. While both approaches were able to correctly identify that the target was in the side lobe, the PLD approach could not distinguish between the two side lobes. In contrast, the extended spectra approach correctly determined that the target was in the right side lobe.

Figure 10A:
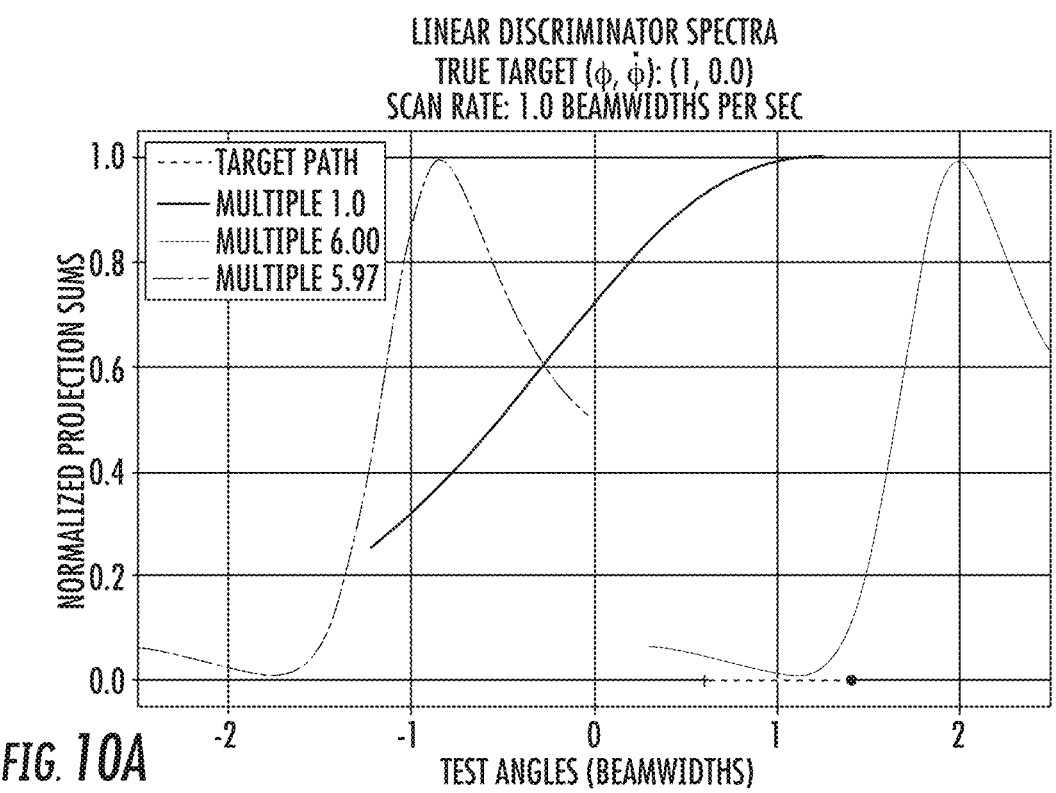
FIGS. 10A-10B show simulated results where a target moving is in the main lobe near the null.
Figure 10B:
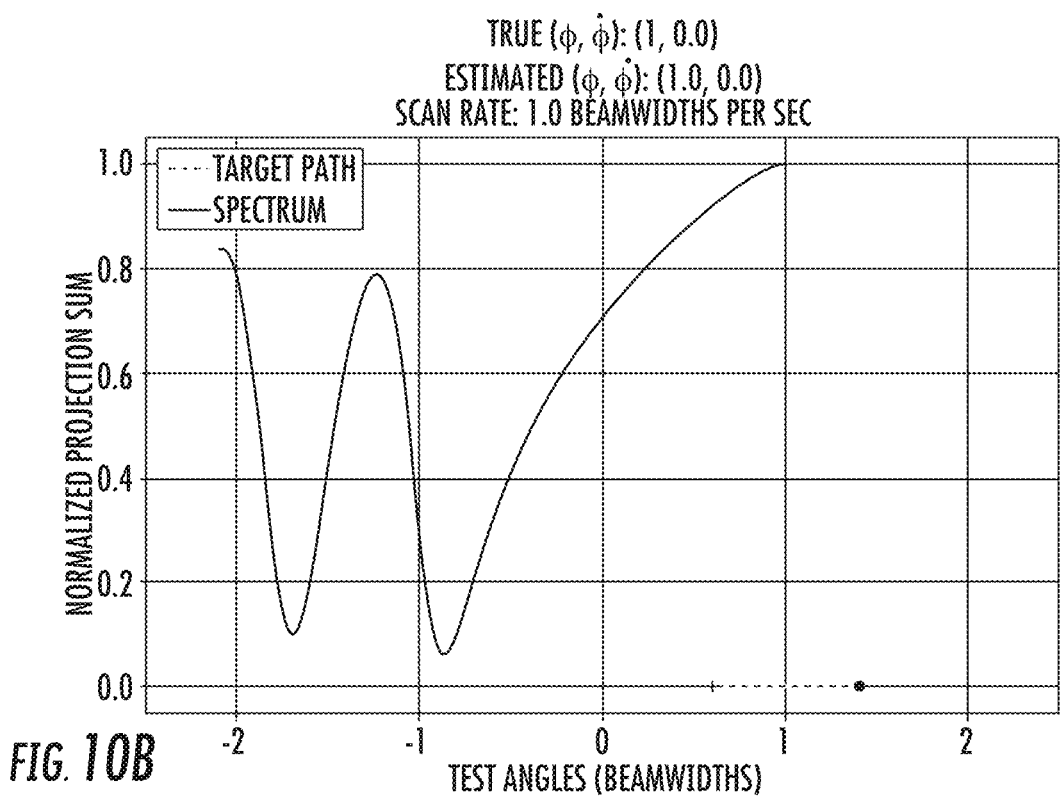

In FIGS. 10A-10B, the target is assumed to be moving through the main lobe near the null as shown in the dotted line. In FIG. 10A, a piecewise linear discriminant (PLD) approach is used to create the test vectors, while FIG. 10B shows the extended spectra approach. Note that this angular range is not within the linear region of the discriminant. Therefore, the PLD approach incorrectly identifies three possible peaks for the target. In contrast, the extended spectra approach again correctly identifies the position of the target.

Thus, these graphs show that the method shown in FIG. 6B may be used to determine the angle and angle rate of a target within a calibrated range, regardless of its azimuth angle.

Estimating Position in Two Directions

The above disclosure describes how to determine the angle and angle rate in one direction. This algorithm can also be expanded to cover two directions, azimuth(φ) and elevation(θ). In this embodiment, the test vectors are three dimensional, in that they include a sum, and two separate difference values (one for azimuth, one for elevation). These test vectors may a function of two variables, i.e.

$$\vec{u}(\varphi,\theta) = [\Delta_{AZ}(\varphi,\theta)\ \Delta_{EL}(\varphi,\theta)\ \Sigma(\varphi\theta)]^T \qquad (13)$$

Assuming that the antenna slews in the azimuth direction at a rate of (φ'$_n$), and does not slew in the elevation direction, this equation may be expanded as follows:

$$\vec{u}_n(\varphi,\theta) = [\Delta_{AZ}(\varphi-\varphi'_n,\theta)\ \Delta_{EL}(\varphi-\varphi'_n,\theta)\ \Sigma(\varphi-\varphi'_n,\theta)]^T \qquad (14)$$

Test vectors may be generated based on these parameters. Note that these test vectors are now 3×1 in size. Therefore, the projection matrix will be a 3×3 matrix. These projection matrices are then used to find the sums, as shown below:

$$E(\varphi,\theta) = \Sigma_{n=1}^{N} \|P_n(\varphi,\theta)\vec{v}_n\|^2 \qquad (15)$$

These sums are found using the flowchart of FIG. 6B, which is modified to utilize θ rather than φ̇. As was described above, the maximum value of the sum, E(φ, θ), defines the most likely azimuth angle and elevation angle.

Figure 11:
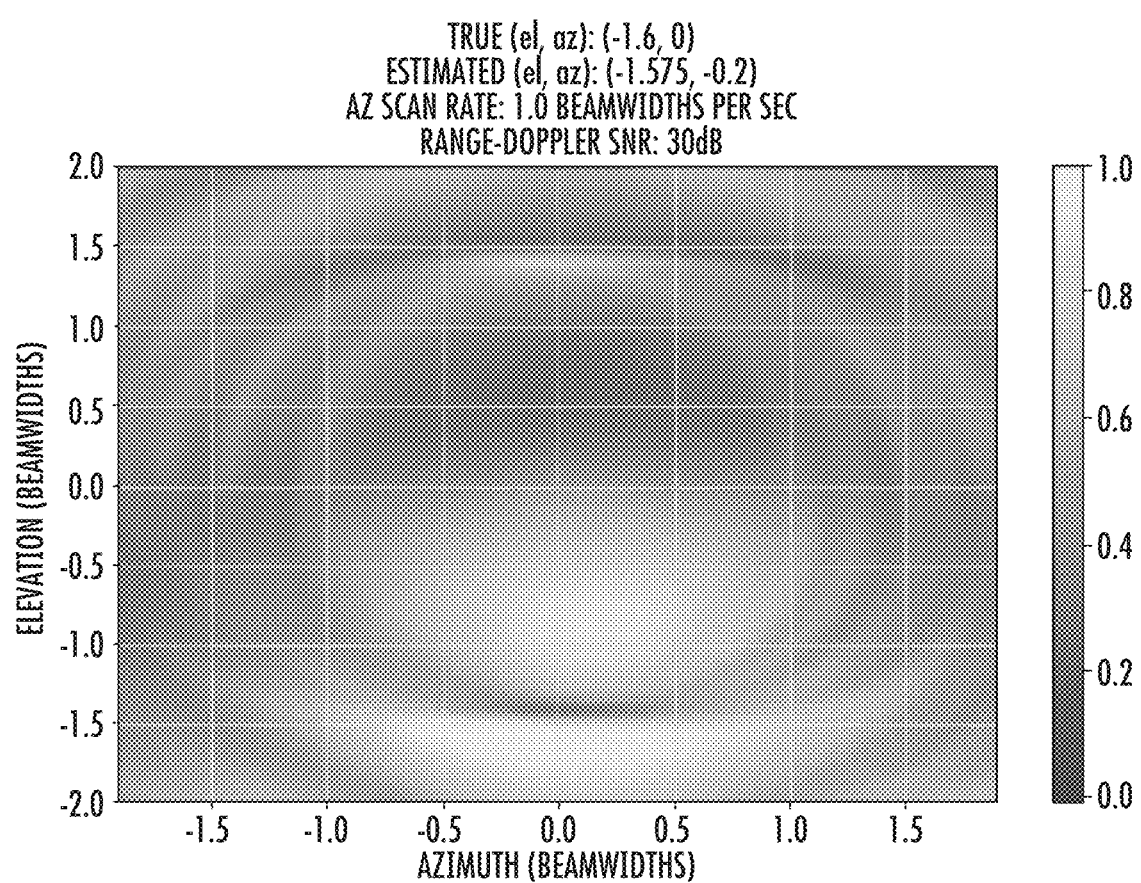
FIG. 11 shows the simulated results where the target is off boresight in the elevation direction.

This algorithm was then tested using a plurality of scenarios. FIG. 11 shows a target that is positioned at an elevation angle of −1.6 and an azimuth angle of 0.0. This algorithm used the Extended Spectra approach described above. Note that the algorithm correctly identified both the azimuth and elevation angles of the target to within 0.025 in the elevation direction and 0.2 in the azimuth direction. Furthermore, the target was correctly identified as being in an elevation side lobe.

Figure 12:
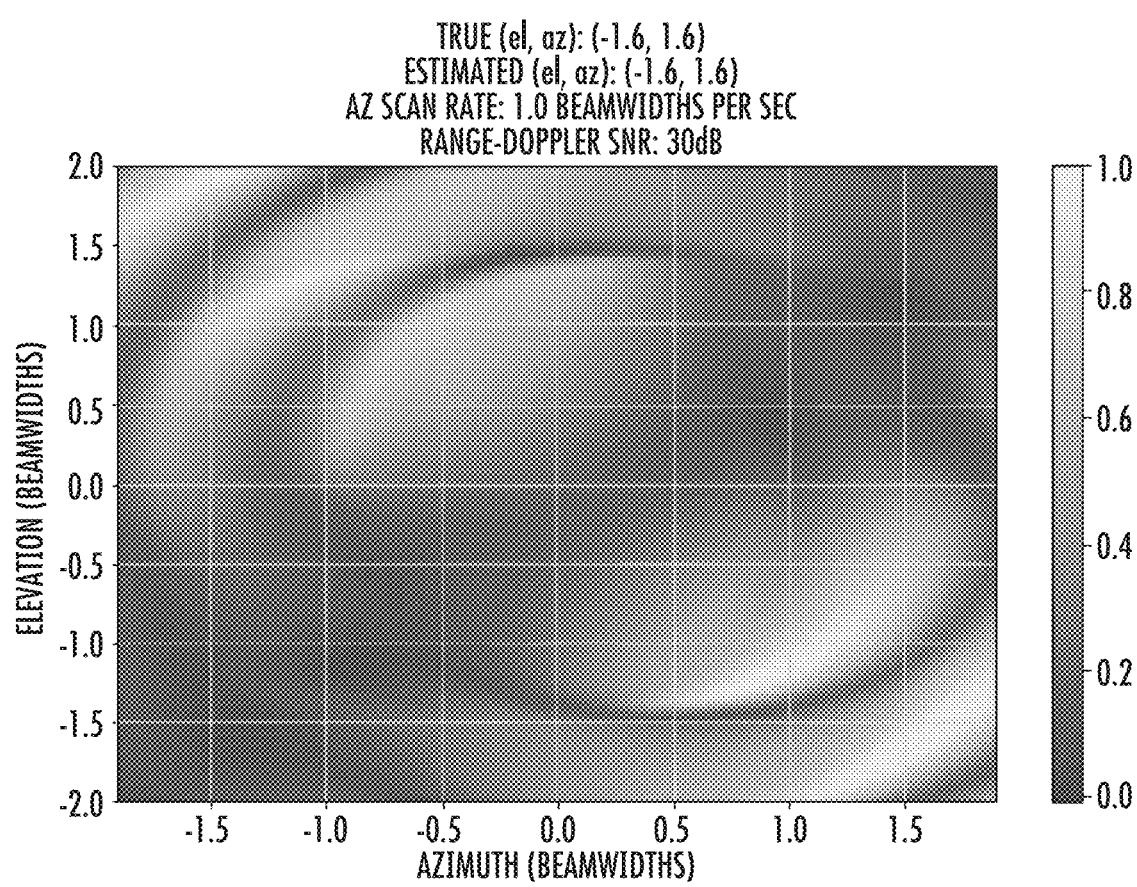
FIG. 12 shows the simulated results where the target is off boresight in the azimuth and elevation directions.

FIG. 12 shows a target that is positioned at an elevation angle of −1.6 and an azimuth angle of 1.6. This algorithm used the Extended Spectra approach described above. Note that the algorithm correctly identified both the azimuth and elevation angles. Furthermore, the target was correctly identified as being in both an azimuth side lobe and an elevation side lobe.

The concepts described above can be combined to calculate azimuth angle, azimuth angle rate, elevation angle, elevation angle rate. In other words, these test vectors may be a function of four variables, i.e.

$$\vec{u}(\varphi,\dot{\varphi},\theta,\dot{\theta})=[\Delta_{AZ}(\varphi,\dot{\varphi},\theta,\dot{\theta})\ \Delta_{EL}(\varphi,\dot{\varphi},\theta\dot{\theta})\ \Sigma(\varphi,\dot{\varphi},\theta,\dot{\theta})]^T \quad (16)$$

Assuming that the antenna slews in the azimuth direction at a rate of $(\varphi'_n)$, and does not slew in the elevation direction, this equation may be expanded as follows:

$$\vec{u}_n(\varphi,\dot{\varphi},\theta,\dot{\theta})=[\Delta_{AZ}(\varphi-\varphi'_n-\dot{\varphi}t_n,\theta-\dot{\theta}t_n)\Delta_{EL}(\varphi-\varphi'_nt_n,\theta-\dot{\theta}t_n,\theta-\dot{\theta}t_n)$$
$$\Sigma(\varphi-\varphi'_n-\dot{\varphi}t_n,\theta-\dot{\theta}t_n)]^T \quad (17)$$

Test vectors may be generated based on these parameters. These projection matrices are then used to find the sums, as shown below:

$$E(\varphi,\dot{\varphi},\theta,\dot{\theta})=\Sigma_{n=1}^N\|P_n(\varphi,\dot{\varphi},\theta,\dot{\theta})\vec{v}_n\|^2 \quad (18)$$

These sums are found using the flowchart of FIG. 6B, which can be modified to also include loops for θ and $\dot{\theta}$. As was described above, the maximum value of the sum, E(φ, $\dot{\varphi}$, θ, $\dot{\theta}$), defines the most likely azimuth angle, azimuth angle rate, elevation angle and elevation angle rate.

In another embodiment, these four parameters are determined in two steps. In the first step, the azimuth angle (φ) and the elevation angle (θ) are calculated assuming angle rates of 0 in two dimensions. This calculation is performed over a large space. After ensuring that the target's azimuth and elevation are within the main beam, a second step can be performed. In this step, E(φ, $\dot{\varphi}$, θ, $\dot{\theta}$) is calculated while limiting the azimuth and elevation angles to values near the estimate provided from step 1.

Having described algorithms for calculating azimuth angle, elevation angle for a slewing antenna, algorithms to calculate azimuth angle, azimuth angle rate, elevation angle, and elevation angle rate, and algorithms for determining whether a target is disposed in a sidelobe, the following section describes how this information can be used.

Figure 13:
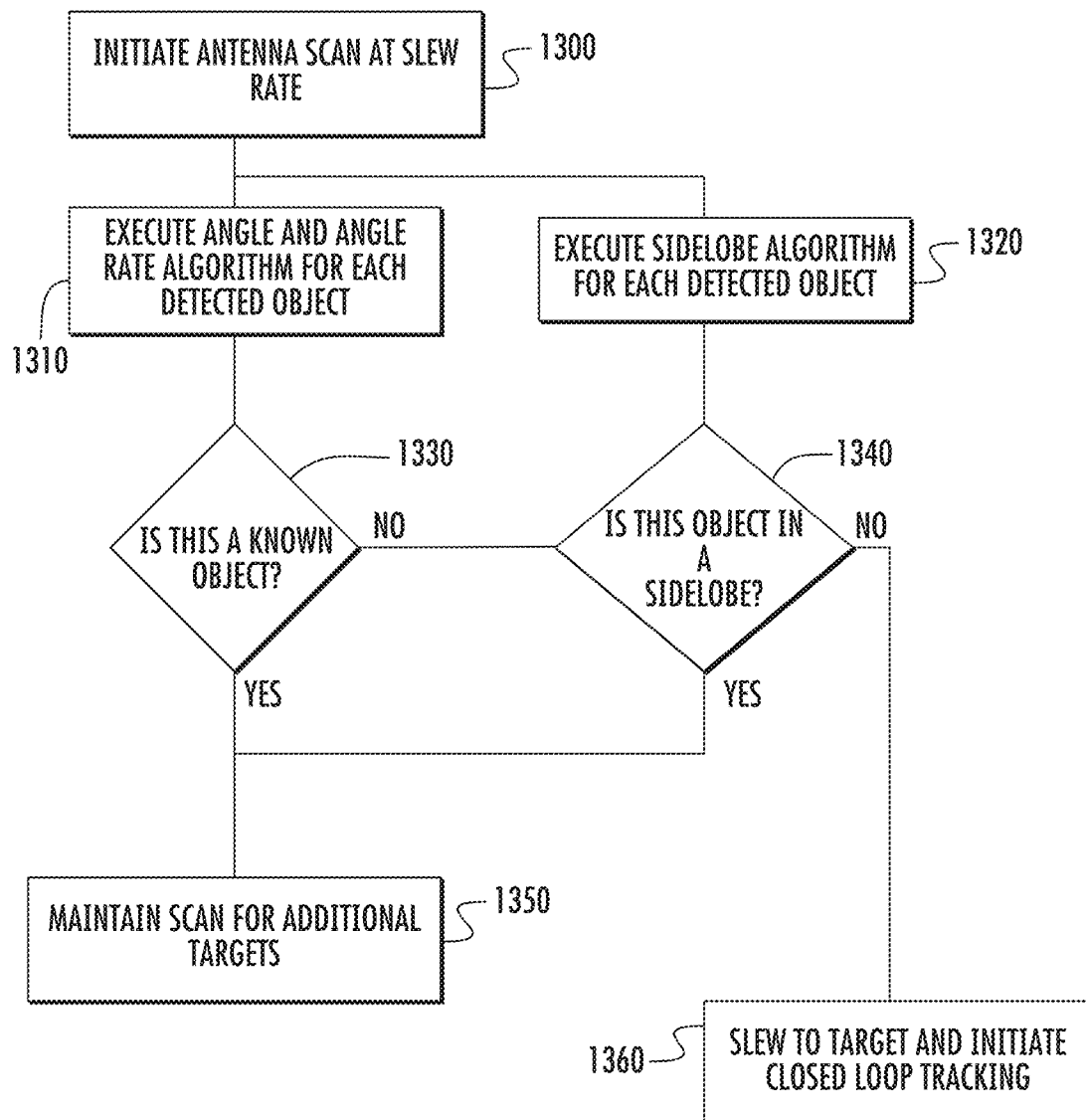
FIG. 13 is a flowchart showing one control system that utilizes the algorithms described herein.

FIG. 13 shows one control system that may employ the algorithms described above. The control system may include at least one controller that executes instructions that allow it to perform the sequence shown in FIG. 13. For example, the control system may be that illustrated in FIG. 5.

First, as shown in Box 1300, the controller may initiate a scan. As described above, the antenna slews in the azimuth direction.

For each object that is detected, an angle estimation algorithm is executed. For example, an angle estimation algorithm is executed to calculate the azimuth and elevation angles of the object. This algorithm may optionally also calculate the azimuth and elevation angle rates of the object. The angle estimation algorithms that are executed are those described above.

The calculated angles and optionally angle rates are inputs to a software program that performs Known Object Recognition. This software program compares the angles and angle rates to a library of objects that are known. In the case of a space radar, known objects include a list of objects in orbit. In the case of an air control radar, known objects include a list of airborne objects around the radar. The output of this software program may be binary. For example, the software program may either indicate that the angle and angle rate inputs correspond to a known object or that they do not.

As shown in Box 1320, if the object is recognized as a known object, the control system maintains the present antenna scan looking for additional objects, as shown in Box 1350.

However, if the object is not recognized, further processing may be performed. For example, for each object that is detected, an algorithm that determines whether the object is in the main lobe or a side lobe may be executed, as shown in Box 1340. This algorithm may be either the extended spectra or PLD methods that were described above.

If it is determined that the object is in a side lobe, the control system assumes that the object will later appear in the main lobe and maintains the present scan, as shown in Box 1350.

If, however, it is determined that the object was in the main lobe and that it is not a known object, the control system may slew the antenna to track the target and initiate closed loop tracking, as shown in Box 1360.

This control system is a significant improvement over existing systems for at least two reasons. First, the angle estimations that are provided to the Known Object Recognition software are much more accurate. This minimizes the possibility of the software not recognizing an object. Additionally, by determining whether the object is in a side lobe, erroneous new objects may be eliminated. For example, in existing systems, an object that appears in a side lobe may be falsely identified as a new object, causing the operator to decide whether this new object should be tracked. Explicitly determining whether the object was in the side lobe eliminates this possibility.

It is noted that other control systems are possible. For example, a conventional angle estimation algorithm may be used in conjunction with the new side lobe detection algorithm. Additionally, the new angle estimation algorithm may be used without the side lobe detection algorithms. Each of these, while perhaps less accurate that the control system of FIG. 13 is an improvement over existing systems.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An antenna system, comprising:
   a slewing monopulse antenna;
   a controller in communication with the slewing monopulse antenna, wherein the controller comprises a processing unit and a memory device, and the memory device contains instructions, which when executed by the processing unit, enable the controller to:

receive a plurality of sets of observed monopulse signals from the antenna, each set of observed monopulse signals indicative of difference and sum channels, wherein each set of observed monopulse signals is generated for a respective pulse transmitted by the slewing monopulse antenna;

associate each set of observed monopulse signals with a time and a slew angle;

generate an observed monopulse vector for each set of observed monopulse signals;

compare the observed monopulse vectors with test vectors, wherein the test vectors are generated over a range of angles using a-priori information about the antenna; and determine an angle of a target based on the comparison.

2. The antenna system of claim 1, wherein the test vectors are generated for a range of azimuth and/or elevation angles.

3. The antenna system of claim 2, wherein the controller creates a projection matrix for each test vector, and the projection matrix is multiplied by each of the observed monopulse vectors to create a projection sum for each angle, and the azimuth and/or elevation angle associated with the largest projection sum is determined to be the angle of the target.

4. The antenna system of claim 1, wherein the test vectors are generated for a range of azimuth and/or elevation angles and target angle rates and the controller determines an angle rate of the target based on the comparison.

5. The antenna system of claim 4, wherein the controller creates a projection matrix for each test vector, and the projection matrix is multiplied by each of the observed monopulse vectors to create a projection sum for each angle and target angle rate, and the azimuth and/or elevation angle and target angle rate associated with the largest projection sum are determined to be the angle of the target and the angle rate of the target.

6. The antenna system of claim 1, wherein the angle of the target is compared to a library of objects that are known, and the controller slews the monopulse antenna to the target if the angle of the target does not correspond to any objects that are known.

7. An antenna system, comprising:
a slewing monopulse antenna, wherein the monopulse antenna transits pulses and has a main lobe and one or more sidelobes;
a controller in communication with the slewing monopulse antenna, wherein the controller comprises a processing unit and a memory device, and the memory device contains instructions, which when executed by the processing unit, enable the controller to:
receive a plurality of sets of observed monopulse signals from the antenna, each set of observed monopulse signals indicative of difference and sum channels, wherein each set of observed monopulse signals is generated for a respective pulse transmitted by the slewing monopulse antenna;
generate an observed monopulse vector for each set of observed monopulse signals;
compare the observed monopulse vectors with test vectors, wherein the test vectors are generated over a range of angles using a-priori information about the antenna, wherein the range of angles includes the one or more side lobes; and
determine whether a target is within the main lobe or is in one of the one or more side lobes based on the comparison.

8. The antenna system of claim 7, wherein the controller creates a projection matrix for each test vector, and the projection matrix is multiplied by each of the observed monopulse vectors to create a projection sum for each angle, and the angle associated with the largest projection sum is used to determine whether the target is in the main lobe or in one of the one or more side lobes.

9. The antenna system of claim 7, wherein the controller slews the monopulse antenna in the azimuth direction and wherein, if the target is determined to be in one of the one or more side lobes, the controller continues the slewing to scan for additional targets.

10. An antenna system, comprising:
a slewing monopulse antenna, wherein the monopulse antenna transits pulses and has a main lobe and one or more sidelobes;
a controller in communication with the slewing monopulse antenna, wherein the controller comprises a processing unit and a memory device, and the memory device contains instructions, which when executed by the processing unit, enable the controller to:
receive a plurality of sets of observed monopulse signals from the antenna, each set of observed monopulse signals indicative of difference and sum channels, wherein each set of observed monopulse signals is generated for a respective pulse transmitted by the slewing monopulse antenna;
generate an observed monopulse vector for each set of observed monopulse signals;
compare the observed monopulse vectors with test vectors, wherein the test vectors are generated over a range of angles using a piecewise linear approximation of a discriminant, the discriminant defined as the ratio of the difference channel to the sum channel, wherein the range of angles includes the one or more side lobes; and
determine whether the target is within the main lobe or is in one of the one or more side lobes based on the comparison.

11. The antenna system of claim 10, wherein a slope of the discriminant in the main lobe is less than a slope of the discriminant in the one or more side lobes, and Ere a difference in the slope is used to determine whether the target is within the main lobe.

12. The antenna system of claim 10, wherein the controller slews the monopulse antenna in the azimuth direction and wherein, if the target is determined to be in one of the one or more side lobes, the controller continues the slewing to scan for additional targets.

13. An antenna system, comprising:
a slewing monopulse antenna, wherein the monopulse antenna transits pulses having a main lobe and one or more sidelobes;
a controller in communication with the slewing monopulse antenna, wherein the controller comprises a processing unit and a memory device, and the memory device contains instructions, which when executed by the processing unit, enable the controller to:
slew the antenna to scan for targets; receive a plurality of sets of observed monopulse signals from the antenna, each set of observed monopulse signals indicative of difference and sum channels, wherein each set of observed monopulse signals is generated for a respective pulse transmitted by the slewing monopulse antenna;

determine an angle of the target based on the sets of observed monopulse signals; compare the angle of the target to a library of objects that are known;

if the object is known, continue slewing the antenna;

if the object is not known, determining if the target is in the main lobe or in one of the one or more sidelobes;

if the object is in one of the one or more sidelobes, continue slewing the antenna; and if the object is not known and is in the main lobe, slewing the antenna to the target.

14. The antenna system of claim 13, wherein the instructions to determine the angle of the target comprise instructions, which when executed by the processing unit, enable the controller to:

associate each set of observed monopulse signals with a time and a slew angle;

generate an observed monopulse vector for each set of observed monopulse signals;

compare the observed monopulse vectors with test vectors, wherein the test vectors are generated over a range of angles using a-priori information about the antenna; and determine the angle of the target based on the comparison.

15. The antenna system of claim 13, wherein the controller determines an angle rate of the target based on the sets of observed monopulse signals and the controller compares the angle and the angle rate of the target to the library of objects that are known.

16. The antenna system of claim 15, wherein the instructions to determine the angle and angle rate of the target comprise instructions, which when executed by the processing unit, enable the controller to:

associate each set of observed monopulse signals with a time and a slew angle;

generate an observed monopulse vector for each set of observed monopulse signals;

compare the observed monopulse vectors with test vectors, wherein the test vectors are generated over a range of angles and angle rates using a-priori information about the antenna; and determine the angle and angle rate of the target based on the comparison.

17. The antenna system of claim 13, wherein the instructions to determine if the target is in the main lobe or in one of the one or more sidelobes comprises instructions, which when executed by the processing unit, enable the controller to:

associate each set of observed monopulse signals with a time and a slew angle;

generate an observed monopulse vector for each set of observed monopulse signals;

compare the observed monopulse vectors with test vectors, wherein the test vectors are generated over a range of angles using a-priori information about the antenna, wherein the range of angles includes the one or more side lobes; and determine whether the target is within the main lobe based on the comparison.

18. The antenna system of claim 17, wherein the controller creates a projection matrix for each test vector, and the projection matrix is multiplied by each of the observed monopulse vectors to create a projection sum for each angle, and the angle associated with the largest projection sum is used to determine whether the target is in the main lobe or in one of the one or more side lobes.

19. The antenna system of claim 13, wherein the instructions to determine if the target is in the main lobe or in one of the one or more sidelobes comprises instructions, which when executed by the processing unit, enable the controller to:

generate an observed monopulse vector for each set of observed monopulse signals;

compare the observed monopulse vectors with test vectors, wherein the test vectors are generated over a range of angles using a piecewise linear approximation of a discriminant, the discriminant defined as the ratio of the difference channel to the sum channel, wherein the range of angles includes the one or more side lobes; and determine whether the target is within the main lobe based on the comparison.

* * * * *